United States Patent

[11] 3,612,198

| [72] | Inventor | Mario Gallo<br>Zurich, Switzerland |
|---|---|---|
| [21] | Appl. No. | 765,879 |
| [22] | Filed | Oct. 8, 1968 |
| [45] | Patented | Oct. 12, 1971 |
| [73] | Assignee | Wirth, Gallo & Co.<br>Zurich, Switzerland |
| [32] | Priority | Jan. 26, 1968 |
| [33] | | Switzerland |
| [31] | | 1434/68 |

[54] ELECTRICAL MASS METER
5 Claims, 2 Drawing Figs.

| [52] | U.S. Cl. | 177/210,<br>177/184 |
|---|---|---|
| [51] | Int. Cl. | G01g 3/14 |
| [50] | Field of Search | 177/210,<br>184; 73/141 A |

[56] References Cited
UNITED STATES PATENTS

| 3,366,191 | 1/1968 | Reid et al. | 177/210 |
|---|---|---|---|

FOREIGN PATENTS

| 658,807 | 10/1951 | Great Britain | 177/210 |
|---|---|---|---|
| 916,110 | 1/1963 | Great Britain | 177/210 |

*Primary Examiner*—Richard B. Wilkinson
*Assistant Examiner*—George H. Miller, Jr.
*Attorney*—Stevens, Davis, Miller & Mosher ABSTRACT: A mass meter comprising a baseplate, a weighing platform and two electronically excited, transversely vibratable pretensioned strings, wherein the first string is tensioned by a pretensioning mass and the second string is tensioned by a mass to be measured.

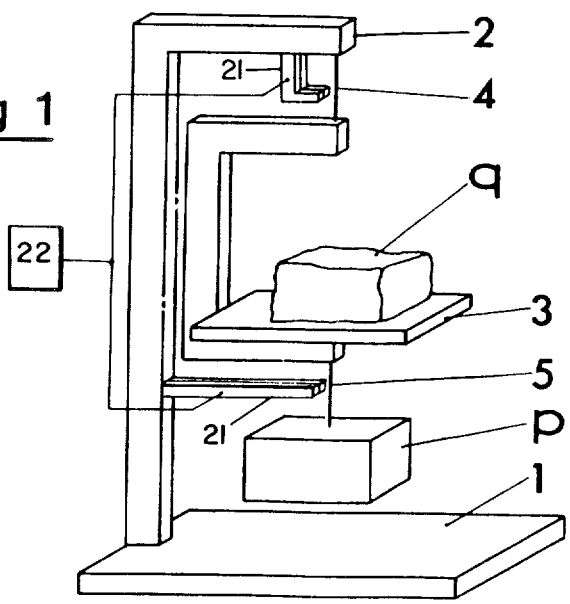
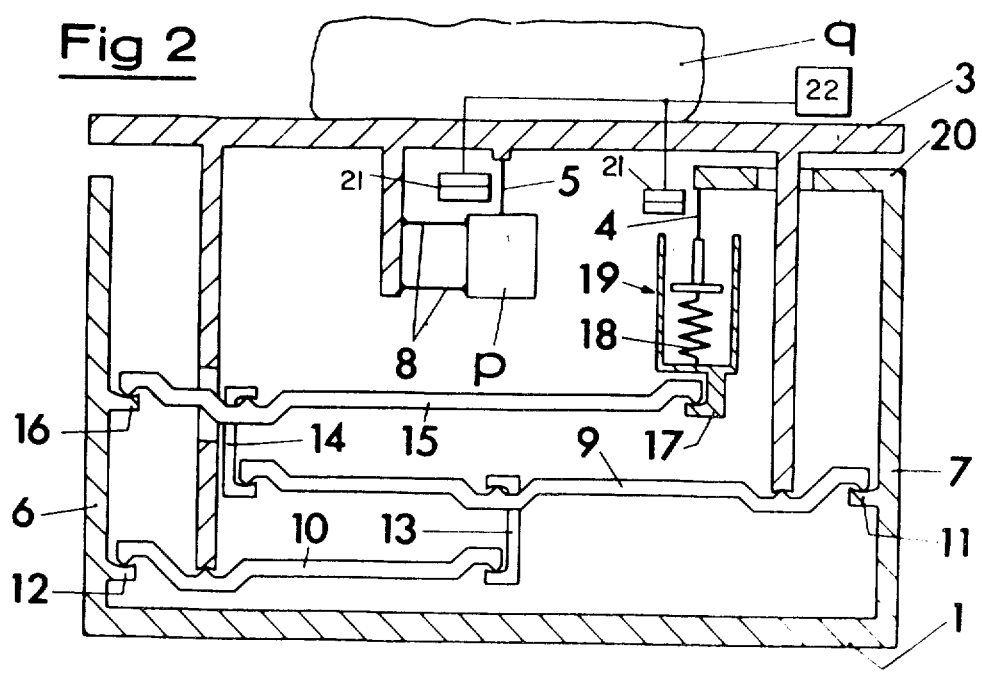

ELECTRICAL MASS METER

The present invention relates to an electrical mass meter comprising a baseplate, a weighing platform and two electronically excited, transversely vibrating pretensioned strings, the first of said strings being tensioned by the weight of a pretensioning mass, whereas the second is tensioned by the mass that is to be measured, and the resultant frequency variations being applied to an evaluating instrument for computing and displaying the magnitude of the measured mass.

Apparatus of such a kind is already known in the art. Substantially they comprise a baseplate, two measuring strings, a pretensioning mass for the first string and a weighing platform which tensions the second measuring string. The load placed on the weighing platform additionally tensions the second string. The resultant frequency variations are transmitted to the input of an evaluating instrument which computes and displays the magnitude of the weighed load.

Substantially the evaluating instrument is required to perform two functions, namely the calculation of the result and the determination of the state of equilibrium, i.e., the determination of the stationary state of the result. In other words, a weighing is not performed until the load has been on the weighing platform undisturbed for a given period of time. A variety of types of such evaluating instruments are already known in the art. The simplest though a very expensive form functions roughly as follows: Each of the frequencies of the two strings is measured by an absolute frequency meter. With due regard to the weighing characteristics of the machine the magnitude of the mass is determined from the two momentary frequencies of the strings.

In order to reduce the required number of components of the evaluating instrument it has been proposed to load the two measuring strings by both the pretensioning mass and the weighing platform. This simplifies the determination of the magnitude of the mass from the two string frequencies. However, compared with mass meters of the first above-described kind these simplified mass meters have the drawback that the properties of the strings are less effectively utilized. The advances that have been made in the field of electronic computation now permit mass meters of the first above-described kind to be used without the necessity of providing excessively complicated evaluating instruments. Nevertheless these mass meters are somewhat sensitive to external vibrations.

When subjected to vertical accelerations—for instance in a lift during the period of stopping and starting—the two masses, i.e., the pretensioning mass and that of the weighing platform bearing the mass to be measured, affect the strings by their so called dynamic weight, i.e., the sum of their weights and the generated inertial forces. The latter are proportional to the mass and its vertical acceleration. So long as the frequency of external vibrations is low—depending upon the properties of the arrangement—the two masses will accurately follow the movements of the baseplate and their accelerations will be the same. In such a case the ratio of the two dynamic weights calculated by the evaluating instrument will be equal to the ratio of the masses themselves. If $Q$ and $P$ are the dynamic weights of the mass $q$ that is to be measured and of the pretensioning mass $P$, $G$ is the acceleration of gravity and $\ddot{z}$ the common vertical acceleration of the two masses, then:

$$\frac{Q}{P} = \frac{q(g+\ddot{z})}{p(g+\ddot{z})} = \frac{q}{p}$$

However, unavoidably the two masses $P$ and $Q$ will be resiliently suspended. The relevant factors are, on the one hand, the elasticity of the string carrying the pretensioning mass and, on the other hand, the elasticity of the string subjected to the mass to be measured, and also that of the framework and of the lever system. The masses $P$ and $Q$ together with their suspension form two elastic vibrating systems weakly coupled by the strings.

If the disturbing frequency is between the two resonant frequencies of the two vibrating systems, then the mass having the lower resonant frequency will cease to follow the movements performed by the baseplate, but the other may still do so. If the disturbing frequency should coincide with one of the two resonant frequencies, then the acceleration of the mass in question will be increased beyond that of the vibration of the foundations by the quality factor of resonance.

In the range of disturbing frequencies which contains the resonant frequencies of the measuring device the accelerations of the masses $q$ and $p$, namely $\ddot{z}_q$ and $\ddot{z}_p$ will no longer be equal to the vibratory acceleration $\ddot{z}$ of the foundation and not to each other. The result will therefore be falsified:

$$\frac{Q}{P} = \frac{q(g+\ddot{z}_q)}{p(g+\ddot{z}_p)} \neq \frac{q}{p}$$

In the case of mass meters for small masses the sensitivity to vibrations can be much reduced by the interposition of highly elastic and damping elements between the baseplate and the table or floor. However, in the case of mass meters for large masses this expedient is too expensive or it will present insuperable difficulties in practice.

It is the object of the present invention to provide a mass meter of the above specified kind in which the sensitivity of the apparatus to vertical vibrations of the foundation or of the baseplate is very small without involving the expenditure of additional means. The problem contemplated by the invention is therefore that of keeping the acceleration of the two masses $P$ and $Q$ as equal as possible, irrespectively of any vibrations of the foundations.

Another object of the invention to provide an electrical mass meter comprising a frame having a baseplate and a weighing platform, a mass to be measured on this weighing platform, an instrument on this frame for evaluation and display of the magnitude of said mass, a first electronically excited, transversely vibrating pretensioned string fixed to said weighing platform, a pretensioning mass fixed to said first string, a second electronically excited, transversely vibrating spring fixed on one end to said baseplate, said weighing platform being fixed to the other end of said string which is thereby additionally loaded by said mass to be measured, the resultant frequency variations being applied to said instrument for computation and display of the magnitude of the mass to be measured, a first vibrating system comprising said pretensioning mass and its suspension elements having a natural frequency which is higher than that of a second vibrating system comprising the mass to be measured and its suspension.

Embodiments of the invention are schematically shown in the accompanying drawing, in which FIG. 1 is a first embodiment, and
FIG. 2 is a second embodiment.

The mass meter which is schematically illustrated in FIG. 1 has a baseplate 1 carrying a yoke 2. Suspended from the latter by means of a measuring string 4 is a weighing platform 3. The latter carries the mass $q$ to be measured. The pretensioning mass $p$ is suspended from underneath the weighing platform by a measuring string 5. The electronical means for exciting the two strings 4 and 5 and the evaluating instrument are well known in the art and not shown in the drawing.

In the embodiment according to FIG. 2 the baseplate 1 carries two lateral upright supports 6 and 7. The weighing platform 3 carries the load $q$. The pretensioning mass $p$ is suspended from a measuring string 5 which is attached to the weighing platform 3. Two links 8 guide the pretensioning mass $p$ parallel to itself. The weighing platform 3 rests on two levers 9 and 10. The lever 9 bears at one end on a projection 11 on one support 7, whereas one end of the lever 10 bears on a projection 12 on the other support 6. Both levers 9 and 10 are coupled by a shackle 13. Moreover, the left-hand end of the lever 9 is coupled by another shackle 14 to another lever 15 which bears on a projection 16 on the support 6. The right-hand end of the lever 15 is coupled by a shackle 17, with the interposition of a spring 18 and a damping element 19, to the measuring string 4, thus applying a load to this string. The measuring string is itself attached to a projection 20 on the support 7.

In this embodiment the conventional means for exciting the measuring strings and sensing their frequency of vibration are shown at 21 and the evaluating instrument is shown by 22.

However, in both instances the pretensioning mass $p$ is suspended in such a way that the natural frequency of the vibrating system formed by its suspension is higher than that of the corresponding system for the mass $q$. Owing to this fact, in combination with the structural features of the described apparatus, the latter is rendered insensitive to vertical vibrations of the floor. If the disturbing frequency is lower than the natural frequency of the system of mass $q$ then the two masses $p$ and $q$ will be submitted to the same acceleration as the floor. However, if the disturbing frequency is between the two natural frequencies, then the accelerations of the mass $q$ will tend to become zero, whereas the biasing pretensioning mass $p$ is still capable of following movements of this mass $q$. Finally, if the disturbing frequency exceeds the natural frequency of the system of the pretensioning mass $p$, then the suspension comprising the series connected measuring strings functions as a filter and the mass $q$ is not affected by the disturbing frequency at all.

I claim:

1. A mass meter comprising: a frame having a baseplate and support means extending therefrom; a first transversely vibrating pretensioned string connected to said frame; a weighing platform for weighing an unknown mass connected to the other end of said first transversely vibrating string; a second transversely vibrating string connected at one end to said weighing platform; a pretensioning mass connected to the other end of said second transversely vibrating string; said first string being loaded by both said weighing platform and said pretensioning mass; means electronically vibrating said strings; a first vibrating system comprising said pretensioning mass and its suspension elements having a natural frequency which is higher than that of a second vibrating system comprising said mass to be measured and its suspension elements; means sensing the vibrations of said strings and means evaluating and displaying the frequency of said vibrations in terms of a mass to be measured.

2. The mass meter of claim 1, further comprising a first vibrating system including said pretensioning mass and its suspension elements and a second vibrating system including said weighing platform and its suspension elements, said first vibrating system having a natural frequency which is higher than that of said second vibrating system.

3. The mass meter of claim 1, further comprising lever means supporting said weighing platform.

4. The mass meter of claim 3, wherein said lever means comprises first and second lever means, each supported at one end by said frame, said first lever means supporting a first portion of said weighing platform and said second lever means supporting a second portion of said weighing platform.

5. The mass meter of claim 4, further comprising a third lever means supported at one end by said frame, the other end thereof being operatively connected to said second string, one end portion of said second lever means being operatively connected to said third lever means, and one end portion of said first lever means being operatively connected to said second lever means.